Dec. 11, 1945.   R. H. MASTERS   2,390,723
INTERNAL-COMBUSTION ENGINE
Filed April 14, 1943
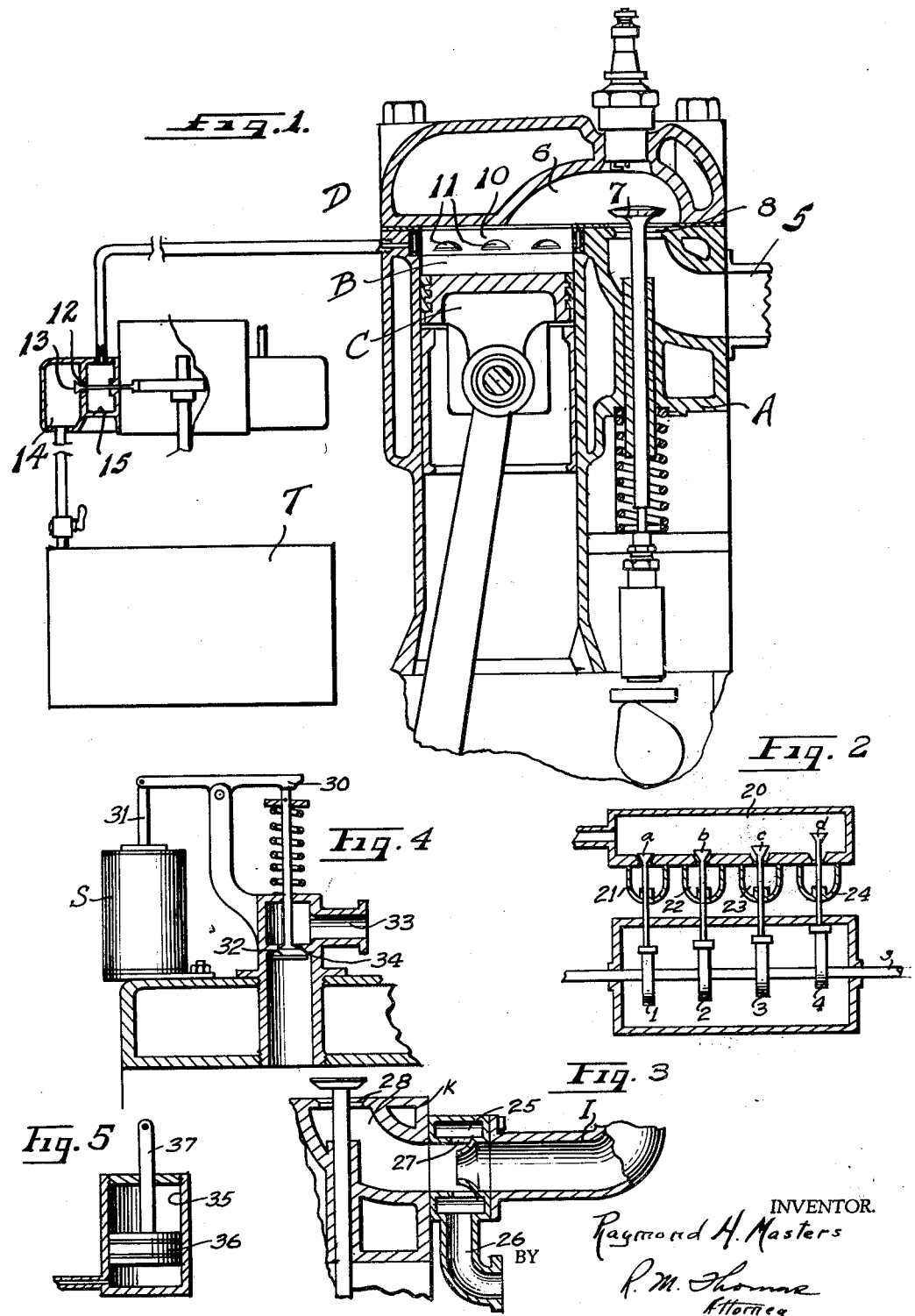

Patented Dec. 11, 1945

2,390,723

UNITED STATES PATENT OFFICE 2,390,723

INTERNAL-COMBUSTION ENGINE

Raymond H. Masters, Salt Lake City, Utah

Application April 14, 1943, Serial No. 483,034

1 Claim. (Cl. 123—76)

My invention relates to internal combustion engines and has for its object to provide a new and highly efficient method of increasing the efficiency and providing greater power with the same throttle opening.

A further object is to provide a power charger for internal combustion engines which when timed properly with the intake and exhaust valves of the engine will scavenge the exhaust valve and chamber and will power charge the intake and compression chamber during the compression stroke increasing the efficiency of the motor and providing greater efficiency with less heating.

A still further object is to provide a means of power charging the compression stroke of an internal combustion engine in such a manner that greater efficiency is attained and a means of so scavenging the exhaust valve, chamber and pipe that there is less back pressure, less heat generated, and thereby greater efficiency obtained, both of which may be employed or either of which may be separately utilized with very good results.

These and other objects I accomplish with the device illustrated in the accompanying drawing in which similar numerals and letters of reference indicate like parts throughout the several views and as described in the specification forming a part of this application and pointed out in the appended claim.

In the drawing in which I have shown my invention

Figure 1 is a diagrammatical sectional view of an internal combustion engine showing my power charger attached thereto.

Figure 2 shows a modified manner of building the power charger for multiple cylinders.

Figure 3 illustrates how the power charge may be installed in the intake manifold of the engine.

Figure 4 illustrates the use of an electrical system for opening and closing the power charger valves.

Figure 5 shows the power piston for operating the arm for controlling the valve by fluid pressure.

In the drawing I have shown the internal combustion engine as A, cylinder as B, piston as C, and head as D. The intake manifold 5 introduces the gas for the carburetor (not shown) into the firing chamber or compression chamber 6 through the valve 7 and seat 8. The power charger consists of an annular hollow ring member 10 fitted into the top end of the cylinder wall, and the hollow ring is provided with downturned tuyère openings or ports 11 through which air under pressure is introduced. A suitable compressor is provided to compress air and store it in a tank T and from the storage tank it is introduced into the engine through a series of valve openings 12 controlled by poppet valves 13 into and through the ports into the compression chamber on the compression stroke of the piston. The air is compressed in the tank T and passes then into an annular distributing chamber 14 in which the valve seats 12 and valves 13 are carried and operated to permit passage of air through the ports into individual chambers 15 and thence to the annular ring member 10 into the cylinder where it is compressed as before mentioned.

A modified manner of introducing the air pressure into the various compression chambers is accomplished with the device shown in Figure 2 in which four valves $a$, $b$, $c$, and $d$, are actuated by four different cams 1, 2, 3 and 4 driven on a common shaft $s$. Each valve controls the flow of air from the air supply chamber 20 through the valve seat into one of the intake manifold areas shown as 21, 22, 23, and 24. This type of device is shown for a four cylinder engine but more cylinders may be serviced by adding more valves, one for each cylinder.

A modified way of introducing the air into the intake manifold for compression stroke or intake stroke is shown in Figure 3 in which an annular chamber 25 is secured between the intake manifold I and the engine block K connecting an air supply conduit 26 with the annular chamber and through a series of ports 27 the air is introduced from the chamber 25 into the intake port 28.

Further modifications for operating the air supply valves are shown in Figures 4 and 5. In Figure 4 a solenoid S is connected to a rocker arm 30 by a rod 31. The rocker arm 30 actuates the valve 32 which permits air from the conduit 33 to pass down through the valve seat 34 into the compression chamber or cylinder of the engine.

The particular type of device may have the solenoid driven or actuated by the engine timer for distributing the energy to the solenoid at the proper time for opening the valve 32. A modified manner of operating the rocker arm 30 is to replace the solenoid with a power cylinder 35 carrying a piston 36 which is connected to the rocker arm by the connecting rod 37 and air pressure may be employed to operate the valve 32 when desired or necessary.

Such modifications and variations as shown are considered within the spirit of the invention and within the scope of the appended claim.

Having thus described my invention I desire to secure by Letters Patent and claim:

A power charger for an internal combustion engine comprising a valve for the cylinder, said valve being opened by timed means to cause a forced draft, or air under compression, to be introduced into the cylinder at predetermined intervals and an annular distributing hollow ported member mounted between the cylinder and the cylinder head to distribute the air into the cylinder in the proper directions for best performance.

RAYMOND H. MASTERS.